(12) United States Patent
Vomweg et al.

(10) Patent No.: US 8,073,290 B2
(45) Date of Patent: Dec. 6, 2011

(54) METHOD AND COMPUTER PROGRAM PRODUCT FOR REGISTERING BIOMEDICAL IMAGES

(75) Inventors: Toni Werner Vomweg, Neuwied (DE); Heiner Faber, Taunusstein (DE); Dirk Mayer, Wiesbaden (DE)

(73) Assignee: Bracco Imaging S.p.A., Milan (IT)

( * ) Notice: Subject to any disclaimer, the term of this patent is extended or adjusted under 35 U.S.C. 154(b) by 969 days.

(21) Appl. No.: 11/815,449

(22) PCT Filed: Jan. 31, 2006

(86) PCT No.: PCT/EP2006/050571
§ 371 (c)(1),
(2), (4) Date: Dec. 7, 2007

(87) PCT Pub. No.: WO2006/082192
PCT Pub. Date: Aug. 10, 2006

(65) Prior Publication Data
US 2008/0292214 A1 Nov. 27, 2008

(51) Int. Cl.
*G06K 9/00* (2006.01)
(52) U.S. Cl. ........ 382/294; 382/128; 382/130; 382/131; 382/197; 382/275
(58) Field of Classification Search .................. 382/128, 382/130, 131, 197, 225, 275, 294
See application file for complete search history.

(56) References Cited

U.S. PATENT DOCUMENTS

| | | | |
|---|---|---|---|
| 5,839,440 A * | 11/1998 | Liou et al. ..................... | 600/431 |
| 6,330,353 B1 | 12/2001 | Lai et al. | |
| 6,456,731 B1 | 9/2002 | Chiba et al. | |
| 7,359,535 B2 * | 4/2008 | Salla et al. ..................... | 382/128 |
| 7,428,318 B1 * | 9/2008 | Madsen et al. ................. | 382/107 |
| 2002/0154798 A1 * | 10/2002 | Cong et al. ..................... | 382/128 |
| 2003/0117611 A1 | 6/2003 | Chon et al. | |

OTHER PUBLICATIONS

Fonseca L. et al., Registration and fusion of multispectral images using a new control point assessment method derived from optical flow ideas, Proceedings of the SPIE—The International Society for Optical Engineering SPIE-Int. Coc. Opt. Eng. USA, vol. 3717, 1999, p. 104-111, XP002335274, ISSN 0277-786X.
Bentoutou Y. et al., An Invariant Approach for Image Registration in Digital Subtraction Angiography, Pattern Recognition, Elsevier, Kidlington, GB, vol. 35., No. 12, Dec. 2002, p. 2853-2865, XP004379654, ISSN 0031-3203.

(Continued)

*Primary Examiner* — Robert Kim
*Assistant Examiner* — Michael Logie
(74) *Attorney, Agent, or Firm* — Themis Law

(57) ABSTRACT

A method of registering biomedical images to reduce imaging artifacts caused by object movement is disclosed, wherein a certain number of features or landmarks is automatically defined and tracked in a first and second image to be registered to determine the optical flow vector between the first and second image. Registration then takes place by applying the inverse optical flow to the second image. The automatic feature selection step is carried out by determining the mean signal intensity in a defined neighborhood for every pixel, which mean signal intensity is then compared to a predetermined threshold. If the mean signal intensity value of said neighborhood is higher than the predetermined threshold the pixel is defined as a feature and is added to a list of features to be tracked.

13 Claims, 11 Drawing Sheets

OTHER PUBLICATIONS

Figure 1:
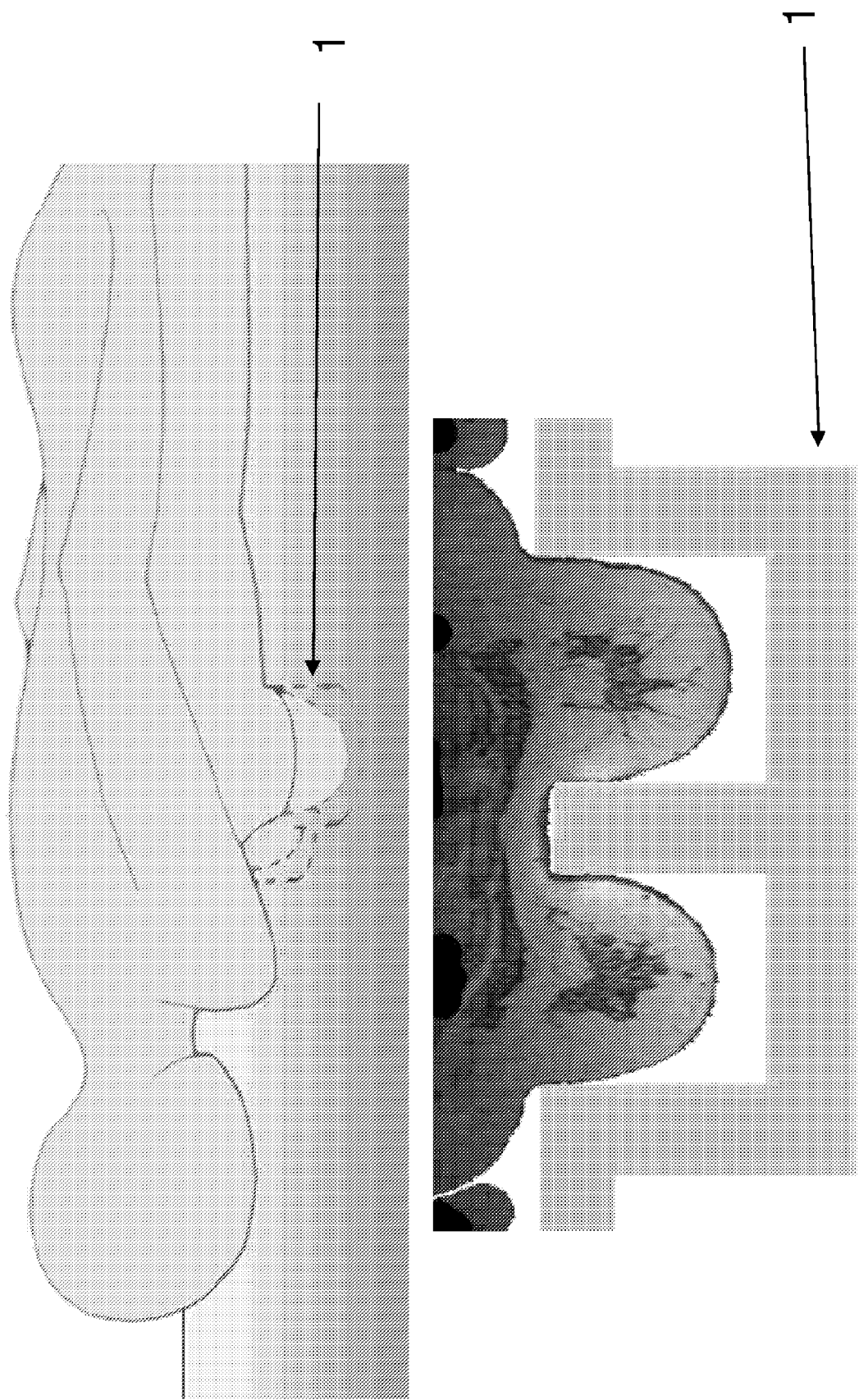

Meijering E.H.W. et al., Image Registration for Digital Subtraction Angiography, International Journal of Computer Vision, Kluwer Academic Publishers, Norwell, US, vol. 31, No. 2/3, Apr. 1999, p. 227-246, XP000832660, ISSN 0920-5691.

Yeung M.M. et al., Three Dimensional Image Registration for Spiral CT Angiography, Proceedings of the Computer Society Conference on Computer Vision and Pattern Recognition, Jun. 21-23, 1994, Los Alamitos, IEEE Comp. Soc. Press., US, Jun. 21, 1994, p. 423-429, XP000515873, ISBN 0-8186-5827-4.

Fonseca L.M.G. et al., Control Point Assessment for Image Registration, Computer Graphics and Image Processing, 1999 Proceedings, XII Brazilian Symposium in Campinas, Bazil, Oct. 17-20, 1999, Los Alamitos, CA, US, IEEE Comput. Soc.., US, Oct. 17, 1999, p. 125-132, XP010358898, ISBN 0-7695-0481-7.

Lucas B.D. et al., An Iterative Image Registration Technique with an Application to Stereo Vision, International Conference on Artificial nteligence, Aug. 24, 1981, p. 674-679, XP001032964.

\* cited by examiner

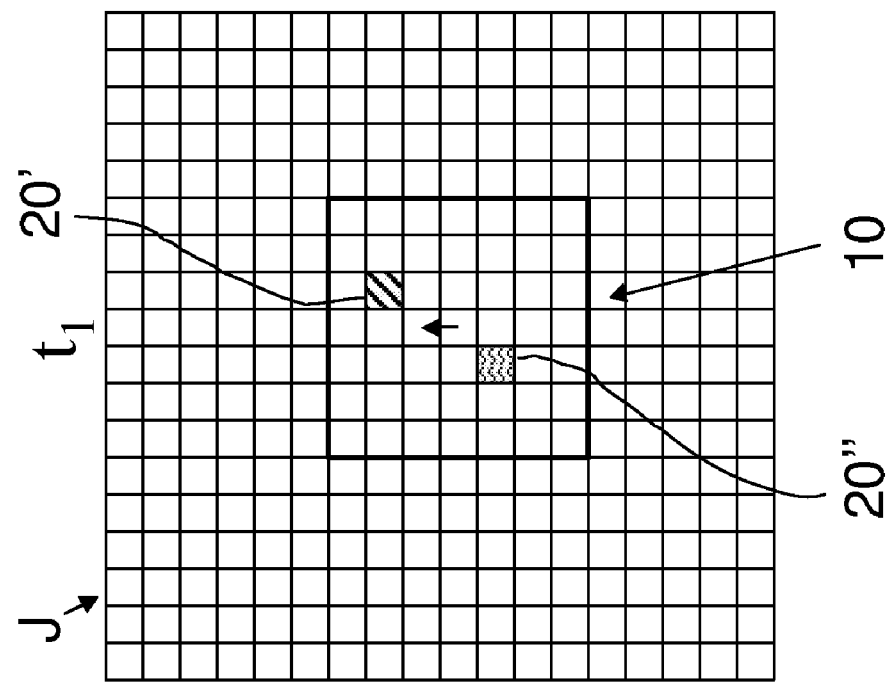
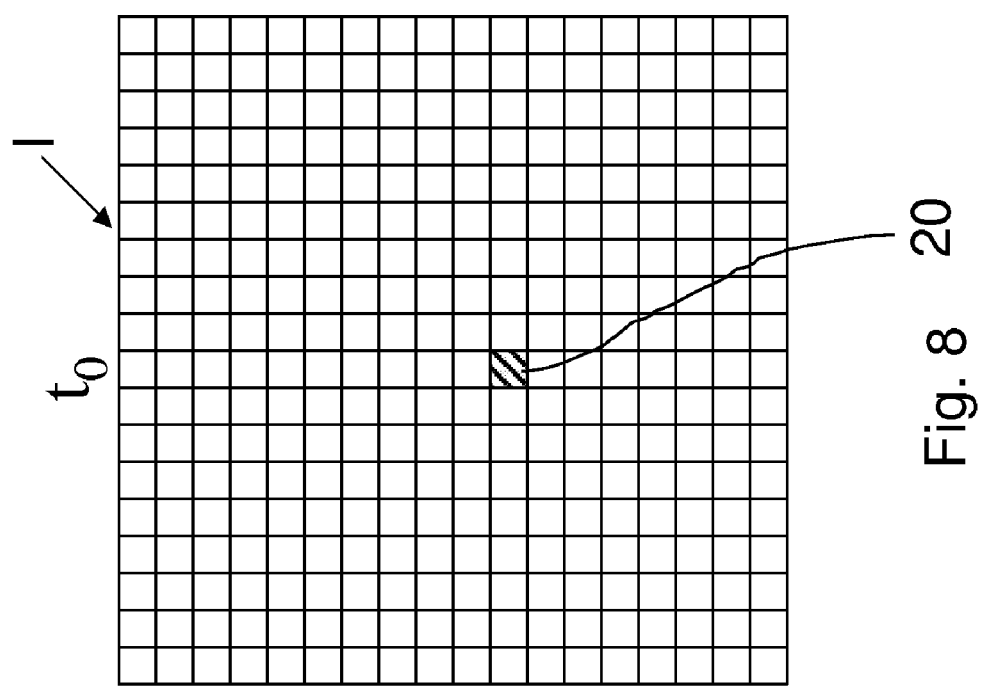
Fig. 8

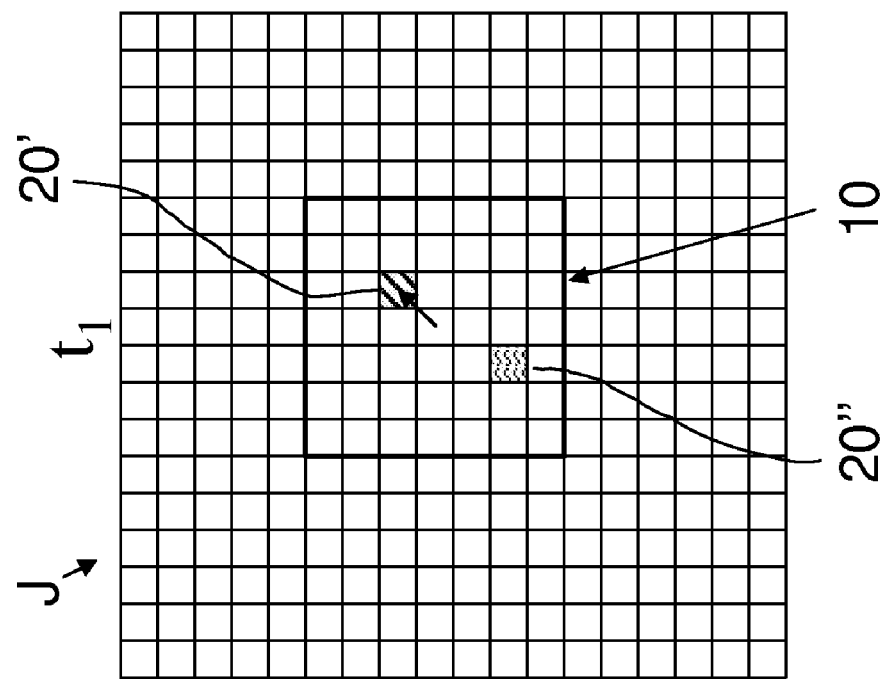
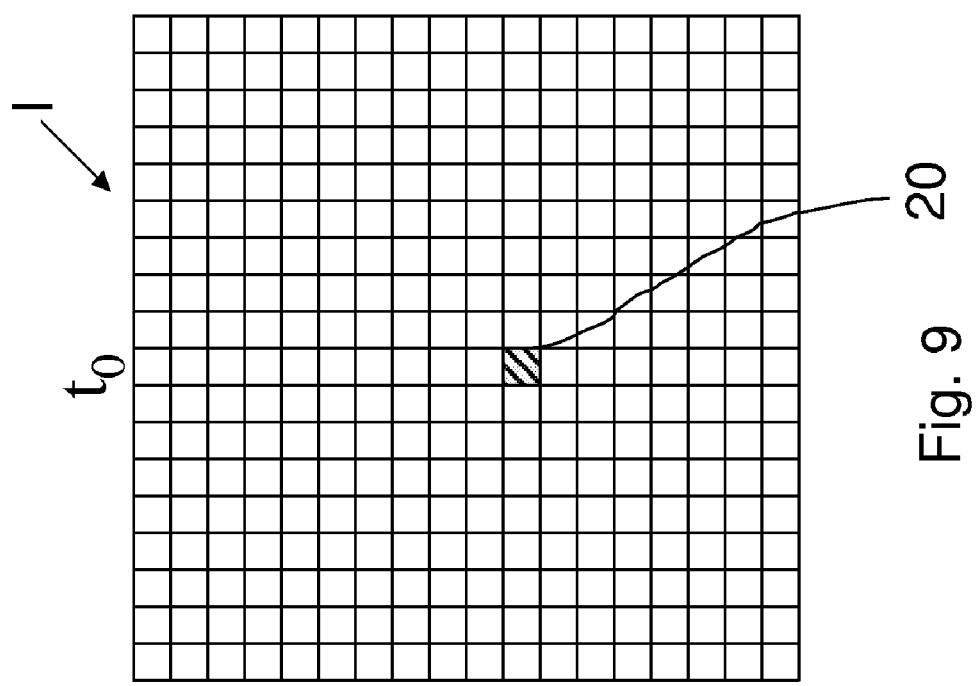
Fig. 9

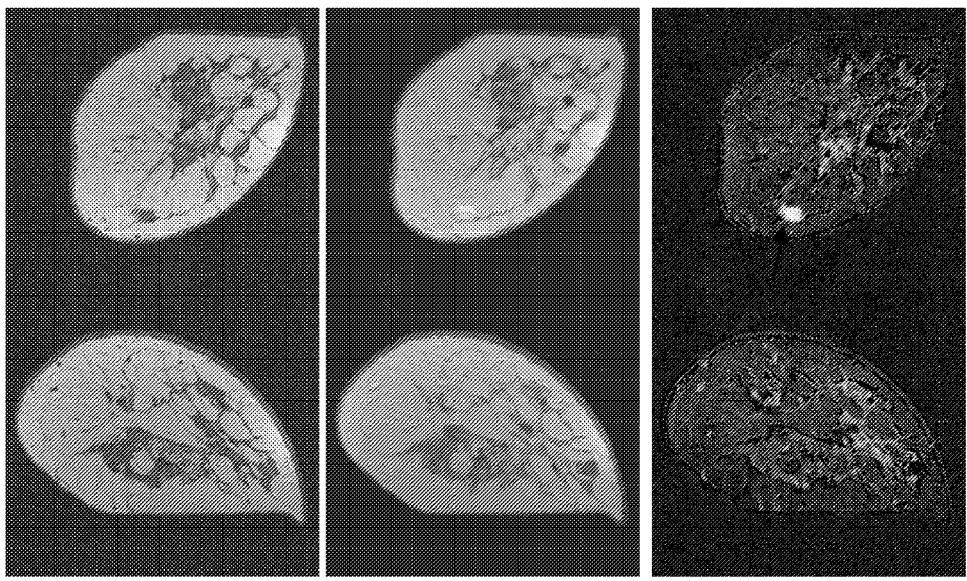
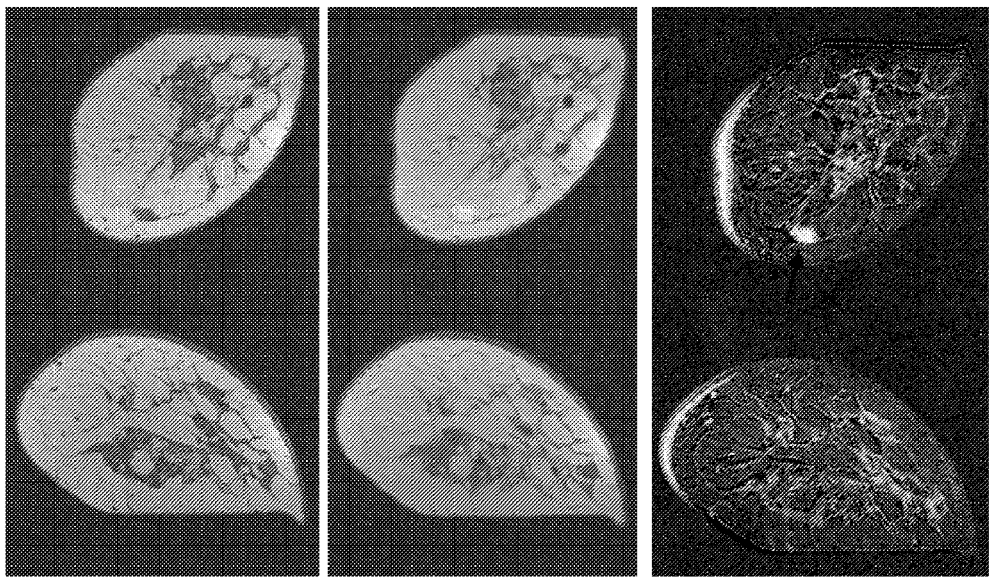
Fig. 11

METHOD AND COMPUTER PROGRAM PRODUCT FOR REGISTERING BIOMEDICAL IMAGES

The invention relates to a method for registering images comprising the steps of:

a) Providing at least a first and a second digital or digitalized image or set of cross-sectional images of the same object, the said images being formed by a two or three dimensional array of pixels or voxels;

b) Defining within the first image or set of images a certain number of landmarks, so called features by selecting a certain number of pixels or voxels which are set as landmarks or features and generating a list of said features to be tracked;

c) Tracking the position of each pixel or voxel selected as a feature from the first to the second image or set of images by determining the optical flow vector from the first to the second image or set of images for each pixel or voxel selected as a feature;

d) Registering the first and the second image or set of images by applying the inverse optical flow to the pixels or voxels of the second image or set of images.

Such kind of registration method of the images being part of a time sequence is known for example from document U.S. Pat. No. 6,553,152.

Document U.S. Pat. No. 6,553,152 provides an image registration method for two images done by visual landmark identification and marking of corresponding pixels on both images by a human operator.

This way leaves the selection of landmarks completely to the skill of the operator and is practically very difficult to be carried out when no significantly or univocally recognizable structures are present in the images. Considering diagnostic images such as Magnetic Resonance Imaging (MRI) or Ultrasound or radiographic images the visual identification of a landmark by means of structural features of the images is extremely difficult and can cause big errors.

A variety of different algorithms tries to identify contours as disclosed in Fischer, B.; Modersitzki, J. *Curvature Based Registration with Applications to MRMammography*; Springer-Verlag Berlin Heidelberg: ICCS 2002, LNCS 2331, 2002; pp 202-206 or landmarks within radiological images of an organ/region that has been measured twice or more times or has even been investigated with different modalities as for example has been disclosed in Shi J, Tomasi C. *Good Features to Track*. 1994 IEEE Conference on Computer Vision and Pattern Recognition (CVPR '94) 1994; 593-600 and in Tommasini T, Fusiello A, Trucco E, Roberto V. *Making Good Features Track Better* Proc. IEEE Int. Conf. on Computer Vision and Pattern Recognition (CVPR '98) 1998; 178-183 and in Ruiter, N. V.; Muller, T. O.; Stotzka, R.; Kaiser, W. A. Elastic registration of x-ray mammograms and three-dimensional magnetic resonance imaging data. *J Digit Imaging* 2001, 14, 52-55.

Registering two plain images of the same object taken at different times to calculate object movement over the time is called two dimensional registration. An algorithm doing the same but working on three dimensional sets of images, e.g. sets of cross-sectional images of MRI or Computed Tomography (CT) scanners is called three dimensional. Movement of landmarks or objects may occur in any direction within these image sets.

Depending on the number of different modalities of imaging to be compared algorithms are divided into mono- or single-modal registration and multimodal registration algorithms.

Comparing two MRI series is a single-modal registration. Normally single-modal registration algorithms try to identify definite landmarks or complex shapes within both images, mostly working in two dimensions. In a second step the position of corresponding landmarks in both images is compared and their movement vector is calculated. This information is used to shift back all pixels of the second image into a new position to eliminate movement artefacts.

"Rigid registration" shifts a two or three dimensional image/volume as a single unit into a certain direction. "Non-rigid registration" just moves single or multiple pixels/voxels of certain areas/volumes into different directions.

Regarding for example breast tissue which is very flexible, non-rigid registration is needed to eliminate movement artefacts.

Because of its special consistency without any forming structures like bones, parts of the breast directly neighboured could move into different directions. Therefore it is obvious that any registration algorithm or any other existing approach has to identify and spread landmarks all over the breast tissue.

One group of algorithms define a finite number of landmarks that have to be found. These will be sorted by their valence. Regarding breast MR images these approaches often find a high number of landmarks at the outer boundaries of the breast and at chest structures because of high contrast between fat/air in MRI (Huwer, S.; Rahmel, J.; Wangenheim, A. v. Data-Driven Registration for Lacal Deformations. *Pattern Recognition Letters* 1996, 17, 951-957).

Using a compression panel or at least having both breasts fixed by lying on them in prone position normally leads to a good fixation of all parts of the skin having direct contact to the compression device (FIG. 1). In contrast the inner area of both breasts keeps on moving slightly by heartbeat and breathing. Because of the much lower contrast between fat and parenchyma in comparison to the outer skin/air boundary the number of valid landmarks within the centre of the breast remains low in these algorithms.

A general problem in landmark selection resides in the fact that selecting too few landmarks may result in an insufficient or inaccurate registration. However selecting additional landmarks does not necessarily guarantee accurate registration, because a human observer or any program could be forced to include landmarks of lower certainty of being reallocated e.g. caused by lower contrast of different tissue types in the centre of the breast. Rising the number of landmarks will always significantly increase the computational complexity of registration.

A feature selection and feature tracking algorithm which is particularly suited for so called non rigid registration is the so called Lucas & Kanade algorithm and its particular pyramidal implementation which are disclosed in detail in Lucas B D, Kanade T. *An Iterative Image Registration Technique with an Application to Stereo Vision*, IJCAI81; 674-679 1981 and in Bouguet J-Y. *Pyramidal Implementation of the Lucas Kanade Feature Tracker*, TechReport as Part of Open Computer Vision Library Documentation, Intel Corporation enclosed hereinafter as appendix 1. Lucas & Kanade technique and its pyramidal feature tracking implementation is particularly suited for automatically identifying reliable landmarks in the images and for tracking them between two images taken at different times. The displacements or shifts of the features selected are determined as shifts or so called optical flow vectors. This technique is widely applied for example for computer vision in robotics and is part of the general knowledge of the skilled person in digital image processing and computer vision being taught in several basic courses.

However considering the practical use of the Lucas and Kanade technique applied to digital or digitalized diagnostic images and more particularly to the breasts the said technique identifies too many features also outside the region of interest and is subject to noise for example within the air surrounding the breasts.

The following example gives a more detailed view of the problems cited above.

Contrast-enhanced (CE) Magnetic-Resonance-Mammography (MRM) is a useful and important investigation with exquisite sensitivity for invasive tumours. It shows a high negative predictive value independent of the density of breast parenchyma. Recent multi-centre studies indicate that sensitivity and specificity differ according to the techniques of image analysis. Using 1.5 T scanners sensitivities of 96, 93 or 86% and specificities of 30, 50 or 70% respectively have been calculated. Therefore, the main disadvantage of MRM remains to be the high percentage of false positive diagnoses.

Normally MR imaging is performed on a 1.0 or 1.5 Tesla imager with the manufacturer's double breast coil used (often a single breast coil device in the USA) while the patient is in prone position. The protocol does at least include a dynamic contrast enhanced T1-weighted sequence in any orientation with an acquisition time of something between 30 and 180 s. At least one measurement is acquired before and several measurements after bolus injection of gadopentetate dimeglumine or any other paramagnetic MR contrast agents.

To calculate the real contrast agent uptake of an area of breast tissue the signal intensity of each voxel before contrast agent application has to be subtracted from the signal intensity after contrast agent application. Because of minimal movements of both breasts caused by respiration and heartbeat as well as partial volume effects caused by the slice thickness of MR-images, voxels of the same image position taken at different times do not exactly show the same volume of breast tissue. Therefore the subtraction image is not absolutely black (except for the tumour). The effect of small movements could be demonstrated best at the outer boundaries of the breast. Because of the high signal intensity of fatty tissue and a signal intensity of about zero of the surrounding air a very small movement places fat at the former image position of air. Subtracting zero signal intensity of air from high signal intensity of fat falsly simulates a high signal elevation by CM application. As a result subtraction images show a thick white line representing a strong contrast agent uptake around at least parts of the imaged breast (FIG. 2—The white outer border of the breast is marked by signs).

Considering a three dimensional or volumetric image acquisition defined by a Cartesian system, in addition to any movement in x and y direction one will always find some movement in z-direction (towards the chest) This is caused by patient relaxation during the course of the investigation.

To reduce artefacts, breasts are normally fixed inside the breast coil by some kind of compression method (depending on the manufacturer). But despite this fact minimal movement always take place. Thus despite fixing of the breasts the images show always slight movement artefacts in x, y and z direction, which movement artefacts are visualized in the subtraction image as bright pixel. Without movement artefacts the subtraction image should be absolutely black except than for the area occupied by the tumoral tissue.

A certain number of landmarks is detected outside the breasts within the noisy signal of surrounding air. Besides the fact that each feature considered has to be tracked and causes an unnecessary computational burden, noise is a random effect and all features or landmarks found in the noise will not have a corresponding landmark in the second or subsequent images. But in fact an algorithm searching landmarks in the second or subsequent image or set of images corresponding to the landmarks found within the noise before, will somehow reallocate a certain amount of landmarks in the second image or set of images. This can lead to incorrect registration of the images and influence the result.

Object of the present invention consist in providing a method for registering images, particularly biomedical diagnostic images organized in three dimensions, that overcomes effectively the drawbacks of the known registration methods by being able to track movement in three dimensions, by reducing artefacts due to noise particularly outside the region of interest in digital or digitalized images and by spreading landmarks all over the breasts independent of high or low differences in signal intensity of neighboured tissue types.

According to the present invention the method for registering images consists of the following steps:

a) providing a first digital or digitalized image or set of cross-sectional images taken by MRI, Ultrasound or radiographic scanning of a tissue or tissue zone or of an anatomical district; the said images being formed by a two or three dimensional array of pixels or voxels; providing at least a second digital or digitalized image or set of cross-sectional images of the same anatomical district taken by MRI, Ultrasound or radiographic scanning of the same tissue or tissue zone or of the same anatomical district at a second time optional in presence of a contrast media in the said tissue or tissue zone or in the said anatomical district;

b) Defining within the first image or set of images a certain number of landmarks, so called features, by selecting a certain number of pixels or voxels which are set as landmarks or features and generating a list of said features to be tracked;

c) Tracking the position of each pixel or voxel selected as a feature from the first to the second image or set of images by determining the optical flow vector from the first to the second image or set of images for each pixel or voxel selected as a feature;

d) Registering the first and the second image or set of images by applying the inverse optical flow to the pixels or voxels of the second image or set of images.

e) subtracting the image data of the first image form the second image data of the second image after registration at step d);

f) displaying the image data obtained by the subtraction of the image data of the first image form the second image data of the second image.

Step b "feature selection" can be described more detailed as follows:

B1) defining a pixel or voxel neighbourhood around each pixel or voxel of the first image or first set of cross-sectional images, the said pixel or voxel neighbourhood comprising a limited number of pixels or voxels; a two dimensional neighbourhood is choosen in case of a single image, a three dimensional neighbourhood is chosen in case of a set of cross-sectional images;

B2) for each pixel or voxel determining a mean signal intensity value of all pixels or voxels of the said neighbourhood of pixel or voxels;

B3) defining a mean signal intensity value threshold;

B4) comparing the mean signal intensity value determined for each pixel or voxel neighbourhood at step B2 and comparing the said mean signal intensity value with the mean signal intensity value threshold;

B5) in case of the mean signal intensity value of the said neighbourhood higher than the threshold at step B4 the pixels or voxels is defined as a feature to be tracked and is added to a list of features to be tracked.

The mean signal intensity threshold value is adjustable and can be varied. Empiric or experimental criteria can be applied for determining such threshold value for example by carrying out the method on a set of test or sample images and comparing the results obtained for different threshold values.

Although the method according to the present invention any kind of method for selecting the pixels or voxels which can be defined as features of the image to be tracked can be applied, best results are achieved by applying an automatic feature selection method according to the well known Lucas & Kanade method which is described with greater detail in Lucas B D, Kanade T. *An Iterative Image Registration Technique with an Application to Stereo Vision*, IJCAI81; 674-679 1981.

Tracking the displacement of the features from the first to the second image by means of a shift or displacement vector so called optical flow is also a known method. Also in this case the present invention can be applied to several tracking methods which make use of landmarks or features. Particularly if the special case is considered of the small movements in confined breast during a diagnostic imaging session, and the Use of the Lucas and Kanade feature selection method, the present invention preferably make use of a so called "Pyramidal implementation of the Lucas and Kanade feature Tracker" (see appendix 1). This implementation is known to the skilled person and taught in several university courses. A specific and detailed description of this pyramidal implementation of the Lucas & Kanade features tracker is discloses in Bouguet J-Y. Pyramidal Implementation of the Lucas Kanade Feature Tracker, Tech Report as Part of Open Computer Vision Library Documentation, Intel Corporation and in Shi J, Tomasi C. Good Features to Track. 1994 IEEE Conference on Computer Vision and Pattern Recognition (CVPR '94) 1994; 593-600 and in Tommasini T, Fusiello A, Trucco E, Roberto V. Making Good Features Track Better. Proc. IEEE Int. Conf. on Computer Vision and Pattern Recognition (CVPR '98) 1998; 178-183.

Once the optical flow vector is defined for all features, registration of the two images can be carried out by applying the inverse flow to the second image for shifting back each feature of the second image and their surrounding pixels to the position of the said feature in the first image.

As already mentioned the above method can be used for registering two diagnostic images or three dimensional image volumes taken with the same or with different kinds of scanners in Magnetic Resonance Imaging (MRI) or Computed X-ray Tomography (CT)

The above disclosed registration method is also provided in combination with a method for contrast media enhanced diagnostic imaging such as MRI or Ultrasound images and particularly in contrast enhanced Magnetic Resonace Mammography (MRM). In this method in order to calculate the real contrast agent uptake of an area of breast tissue the signal intensity of each voxel before contrast agent application has to be subtracted from the signal intensity after contrast agent application. Thus registering a first image taken at a time in which no contrast agent was present in the imaged tissues with a second image taken at a second or later time at which a contrast agent was present and perfusing in the imaged tissues helps in suppressing at a high degree of success the artefacts which would appear in the said image data subtraction due to patient movement if no registration would be carried out. The mean idea is that subtracting the said two images would lead to high intensity levels of the pixels or voxels corresponding to the tissue zones where the contrast agent is pooled. All the other zones where no contrast agent contribution is present would appear as low intensity pixels or voxels and particularly dark grey or black.

Further improvements are subject matter of the dependent claims.

The features of the present invention and the deriving advantages will appear more clearly from the following more detailed description of the method and from the annexed drawings and figures in which:

FIG. 1 illustrates a schematic example of the breasts fixation means used in breast MRI.

Figure 2:
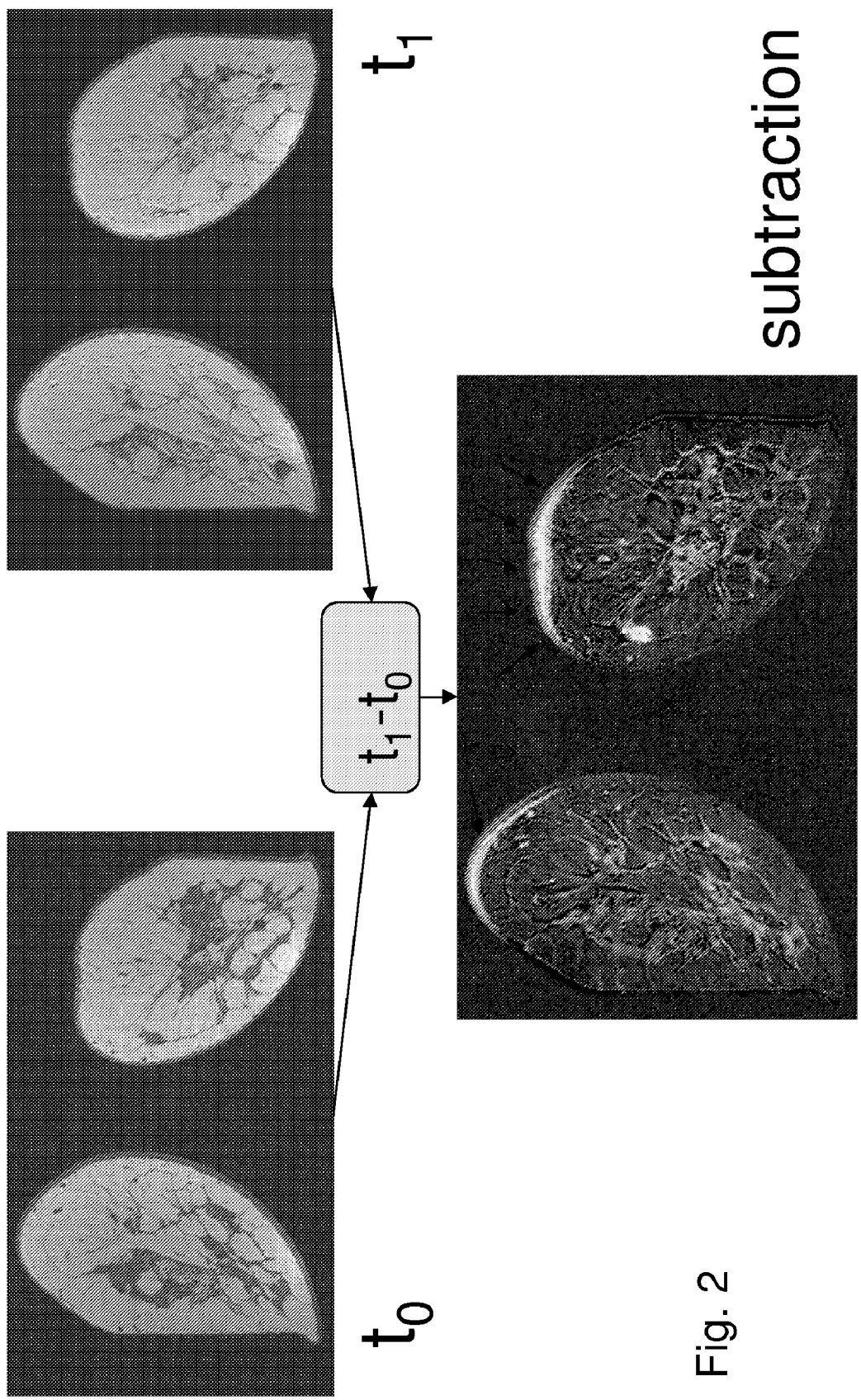

FIG. 2 shows the subtraction process and occurring movement artefacts when no registration step is carried out: At the upper left and right are two cross-sectional images of the breasts of the same MR-scanner position. The second image has been measured after contrast media administration about 2.5 minutes after the first one. Both images are just representative sections of a whole three dimensional set of cross-sectional images.

FIGS. 3 to 6 illustrate schematically a two dimensional image formed by an array of pixels and in which the feature selection criteria are shown with a schematic example.

FIG. 7 to 10 illustrates schematically how the feature tracking is carried out FIG. 11 illustrates the result of the present invention by showing two images of the breasts taken at different times before and after contrast media administration and the image obtained by the subtraction of both after having carried out the feature tracking and the registration of the said images in comparison to the examples of FIG. 2 which is illustrated at the left side of the figure. All images of FIGS. 2 and 11 have been taken from the same MR exam without applying any further processing beside registration.

Although one of the relevant aspects of the present invention is the enlargement of the Lukas and Kanade algorithm from two dimensions to three dimensions, the following graphic examples has been made with refrence to two dimensional images in order to simplify understanding. The Generalisation of the method to the three dimensional images is given by the general description by means of the mathematical formalism.

Automatic feature selection working in three dimensions and therefore in a set of cross-sectional images representing a three dimensional volume of data is a substantial enlargement of Lucas and Kanade's two dimensional feature detection algorithm and is explained in greater detail the following:

Two image volumes of the same patient, which have been recorded with a little difference in time, are defined as I and J.

In the first image volume I a certain number of selected voxels has to be identified which will be considered as feature to be tracked between the two volumes.

Let I be the original/first image volume and J the next volume, where the corresponding features have to be found.

The first step consists of the calculation of minimum eigenvalues in the first image volume. This is carried out as follows:

The first image volume is converted into three gradient volumes Ix, Iy, Iz (x-, y- and z direction of a Cartesian coordinate system describing the image volume) while x, y and z are the coordinates of each single voxel.

Gradient volumes are calculated out of the intensity gradient of each voxels relatively to their neighbouring voxels comprised in a so called window having generally the size of (2?x+1) in the x-direction and (2?y+1) in the y-direction and (2?z+1) in the z direction with ?x, ?y, ?z=1, 2, 3, 4, . . . , n voxels.

Considering the size of the neighbourhood of a 3×3×3 array of voxels centred at the target voxel the three gradient volumes are defined by:

a) gradient volume in X-direction: $I_{\Delta x}(x, y, z) =$ $$\frac{I(x+1, y, z) - I(x-1, y, z)}{2}$$

b) gradient volume in Y-direction: $I_{\Delta y}(x, y, z) =$ $$\frac{I(x, y+1, z) - I(x, y-1, z)}{2}$$

c) gradient volume in Z-direction: $I_{\Delta z}(x, y, z) =$ $$\frac{I(x, y, z+1) - I(x, y, z-1)}{2}$$

As a further step for each voxel a gradient matrix G is set up by using all the three previously calculated gradient volumes as indicated above.

The Gradient matrix is generated as follows:

$$G = \begin{bmatrix} m_{200} & m_{110} & m_{101} \\ m_{110} & m_{020} & m_{011} \\ m_{101} & m_{011} & m_{002} \end{bmatrix} \text{ with}$$

$m_{200} = I_{\Delta x}^2(x, y, z), m_{020} = I_{\Delta y}^2(x, y, z), m_{002} = I_{\Delta z}^2(x, y, z),$ $m_{110} = I_{\Delta x}(x, y, z) \cdot I_{\Delta y}(x, y, z),$ $m_{101} = I_{\Delta x}(x, y, z) \cdot I_{\Delta z}(x, y, z),$ $m_{011} = I_{\Delta y}(x, y, z) \cdot I_{\Delta z}(x, y, z)$ For each gradient matrix of each voxel the minimum eigenvalue ?min calculated out of the gradient matrix according to the following:

Defining: Graphics Gems IV, Paul S. Heckbert, 1994, Academic Press, S 193-98, $$c = m_{200} \cdot m_{020}$$
$$d = m_{011}^2$$
$$e = m_{110} \cdot m_{101}$$
$$f = m_{101} \cdot m_{101}$$
$$p = -m_{200} - m_{020} - m_{002}$$
$$q = c + (m_{200} + m_{020})m_{002} - d - e - f$$
$$r = (e - c)m_{002} + dm_{200} - 2(m_{110} \cdot m_{011} \cdot m_{101}) + f \cdot m_{020}$$
$$a = q - \frac{p^2}{3} \quad b = \frac{2p^3}{27} - \frac{pq}{3} + r$$
$$\theta = \frac{1}{3}\cos^{-1}\left(\frac{3b}{an}\right) \text{ with } n = 2\sqrt{\frac{-a}{3}}$$

note: $\left|3\frac{b}{an}\right| \leq 1 \wedge a \leq 0,$ because G is a matrix of central moments The eigenvalues of the gradient matrix G is computer as $$\lambda_1 = n \cdot \cos\theta - \frac{p}{3}$$

$$\lambda_2 = n\left[\frac{\cos\theta + \sqrt{3}\sin\theta}{2}\right] - \frac{p}{3} \Rightarrow \lambda_m = \text{minimum}(\lambda_1, \lambda_2, \lambda_3)$$

$$\lambda_3 = n\left[\frac{\cos\theta - \sqrt{3}\sin\theta}{2}\right] - \frac{p}{3}$$

A threshold is then defined for the minimum value of the eigenvalue ?m.

The following criteria are then applied to consider whether a voxel is representing a trackable feature or not:

1. If ?m is bigger than the threshold, the actual position of the voxel is stored within a list of features to be tracked.

2. If ?m is smaller than a percentage of the maximum of all minimum values ?m of the eigenvalues, it will be dropped from the list of the features to be tracked.

3. If another feature exists in a defined area (adjustable, e.g. 3×3×3) around the actual feature, the feature with the smaller minimum value ?m of the eigenvalue is dropped from the list of the features to be tracked.

4. If the mean signal intensity value of a 3d-neighbourhood (e.g. ?=1) around the feature position is smaller or equal than a mean signal intensity value threshold at a very low value near zero (e.g. 10), the feature is considered to be located outside the breast within surrounding air and is discarded from the list of features to be tracked.

5. At last only a definable maximum number of features are kept. If more features exist on the list of features to be tracked, features with smaller minimum value ?m are dropped from the list.

Figure 3:
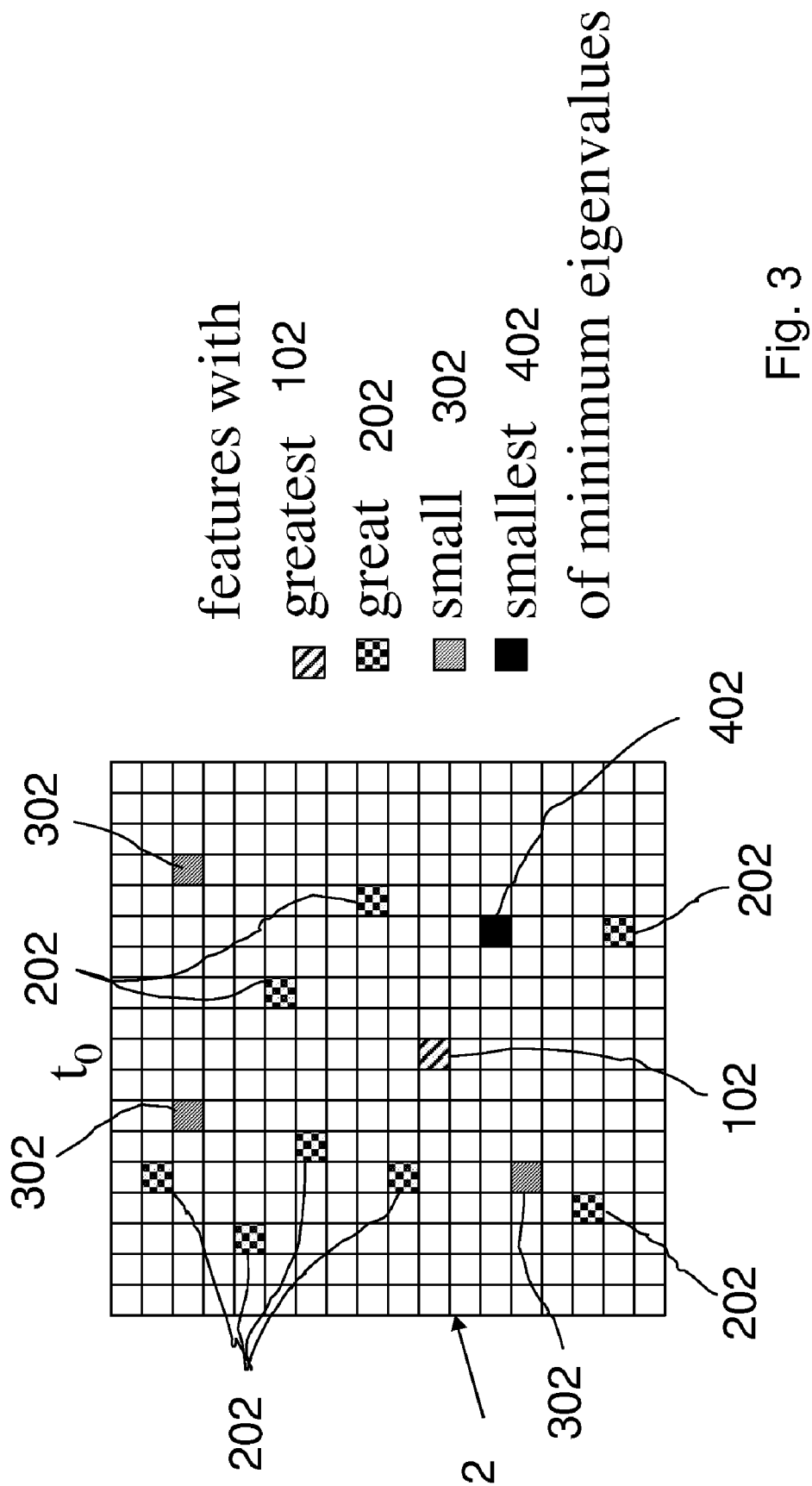
Figure 4:
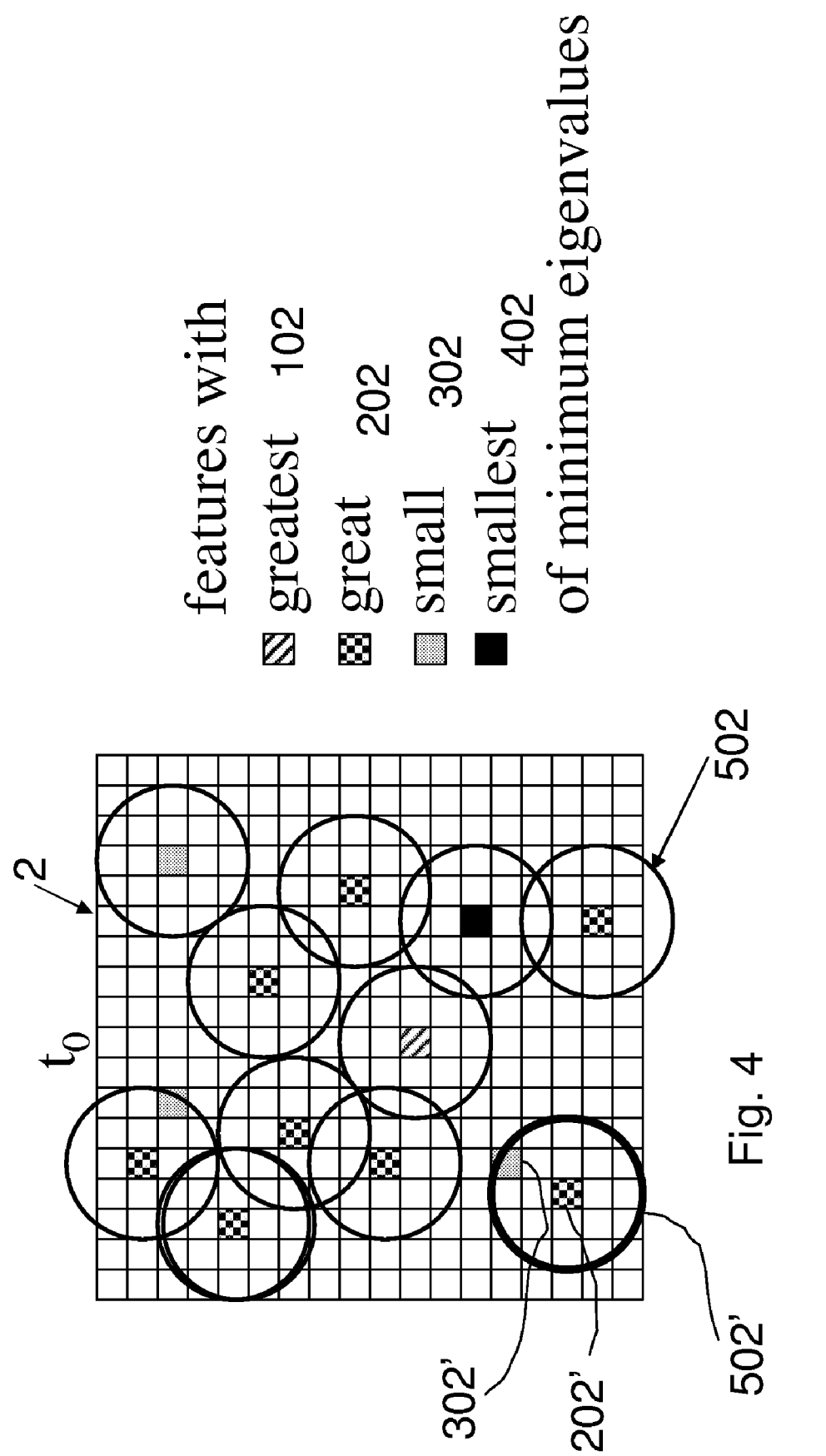

These steps are visually explained in FIGS. 3 to 6 with reference to a two dimensional case. In this case an array of pixels is illustrated as an array of small squares. Different pixels are indicated which correspond to the position of a selected feature with minimum values of the eigenvalue satisfying the first criteria. These features and their position are highlighted in FIG. 3 by giving to the corresponding pixel a different appearance. In FIG. 4 the 5×5 neighbourhood is highlighted by means of circles inscribed inside such a 5×5 array of pixels.

In FIG. 1 a typical apparatus for fixing the breasts of a patient is illustrated. Normally MR imaging is performed on a 1.0 or 1.5 Tesla imager with the manufacturer's double breast coil used (often a single breast coil device in the USA) while the patient is in prone position. The protocol does at least include a dynamic contrast enhanced T1-weighted sequence in any orientation with an acquisition time of something between 30 and 180 s (individual protocols may differ, also fat suppression could be used additionally). At least one measurement is acquired before and several measurements after bolus injection of gadopentetate dimeglumine in doses of 0.1 mmol/kg up to 0.2 mmol/kg body weight or any other paramagnetic MR contrast agents.

At least a first volume of MRI images is acquired at a time t0 before a contrast media is injected into a antecubital vein and therefore arriving in the breasts tissues. At least one further volume of images is acquired directly after contrast media injection at time t1. Normally a sequence of time delayed volumes is acquired (e.g up to six times the same volume in a row after contrast media application).

The two images, taken out of a three-dimensional volume of cross-sectional images to simplify the current figures, have a certain (slice) thickness. Therefore it is more precise to talk about an array of voxels instead of talking about pixels. Each voxel has a predetermined grey level that is correlated to the corresponding signal intensity. In the examples of FIGS. 3 to 10 the grid represents the voxel array. Each element of the grid is a voxel forming the image.

In FIG. 3 as an example four kinds of voxels are individuated as landmarks and are sorted according to the minimum eigenvalue of the corresponding gradient matrix. The voxels indicated with "102" are the voxels having the greatest eigenvalue, "202" indicates voxels of great eigenvalue, "302" indicates voxels of small eigenvalue and "402" indicates voxels with smallest eigenvalue.

In FIG. 4, for each voxel a neighbourhood within an Eucliadian distance of 5 pixels/voxels in diameter is defined around the centered pixel selected as a feature. The said neighbourhood selection is indicated in FIG. 4 by means of circles.

In FIG. 4 a first case of this event is highlighted by the thicker circle indicated with 502'. Here two pixels selected as features are within the same neighbourhood defined above as a Euclidian distance of pixels. These two pixels are indicated with 202' and 302' and according to the above definition one pixel selected as a feature 202' has a gradient matrix with greater eigenvalue than the one the second pixel 302'. Thus this second pixel 302' is discarded.

Figure 5:
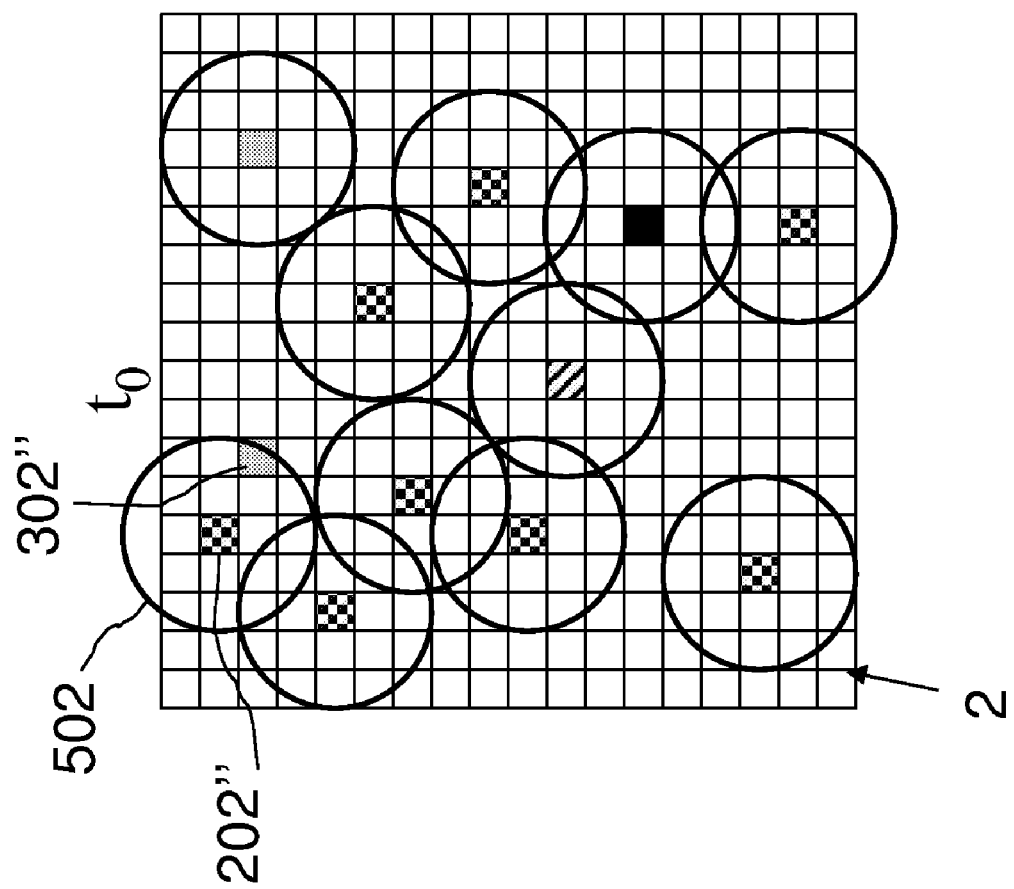

FIG. 5 illustrates a further step and the pixel 302' selected as a feature in FIG. 3 is not anymore present. Here in FIG. 5 the pixel 202" is provided with a circle indicating its neighbourhood. A similar situation as in FIG. 4 is present also here, as in the neighbourhood of pixel 202" a pixel 302" is present which gradient matrix has a smaller eigenvalue than the one of pixel 202".

Therefore also in this case pixel 302" selected as a feature is now discarded from the feature list to be tracked.

Figure 6:
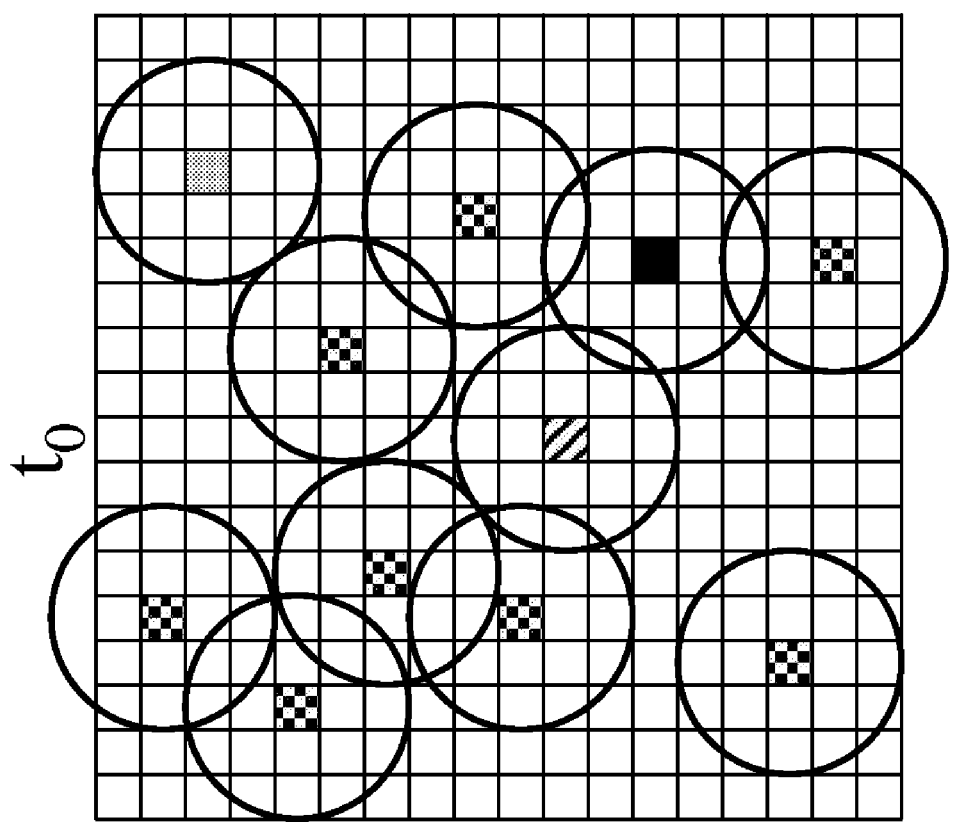
Figure 7:
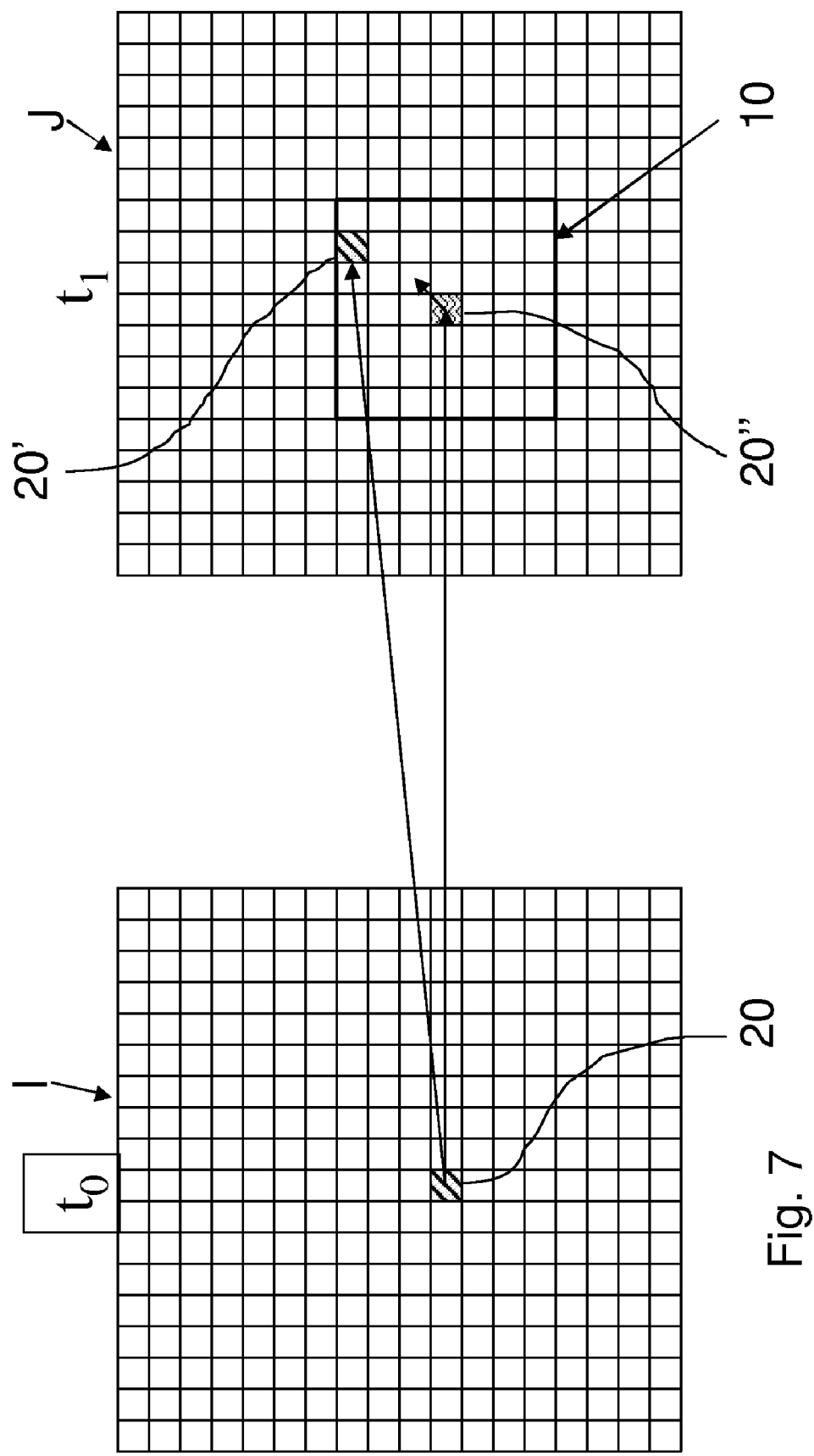

At last in the pixel array of FIG. 6 only some of the original pixel selected as features are present. Within a single neighbourhood one cannot find more than one feature, now. Therefore trackable feature have been spread out all over the image/volume.

According to a further step of the present invention the intensity of the pixels is further investigated and the pixels selected as features having an intensity which is lower than a predefined value are also discarded from the list of pixels corresponding to features to be tracked. A very low threshold of approximately zero is used to characterize features found within the surrounding air. This step is not illustrated but it appears clearly to the skilled person.

Once the pixels or voxels has been determined which are to be considered features of the two 2-dimensional or 3-dimensional images, then tracking of features has to be carried out. According to a preferred embodiment of the present invention, this is carried out by using a so called "Pyramidal Implementation of the Lucas Kanade Feature Tracker". A detailed description has been given by JeanYves Bouguet in the article "Pyramidal Implementation of the Lucas Kanade Feature Tracker, Description of the Algorithm" published By Intel Corporation, Microprocessor Research Labs.

The theory which has been disclosed with reference to a two dimensional example in the above mentioned publication is hereinafter further adapted to a three dimensional case. The following steps have to be carried out for each voxel representing a feature to be tracked which has been individuated according to the above described method and algorithm.

Defining u as a point in volume I and v the corresponding point in volume J. At first step, two pyramids have to be built of the volumes I and J with $I^L$ and $J^L$ representing the volume at level L 0, ..., m with the basement (L=0) representing the original volume. The volume of each following floor is reduced in size by combining a certain amount of pixels in direct neighbourhood to one mean value. The number of additional floors depends on the size of the volume. 4.2. In the following step a so called global pyramidal movement vector g is initialized on the highest floor:

$$g^{Lm} = [g_x^{Lm} \quad g_y^{Lm} \quad g_z^{Lm}]^T = [0 \quad 0 \quad 0]^T$$

For all levels L the resulting movement vector $d^L$ is then calculated.

This is carried out according to the following steps:

a) In each Volume $I^L$ the position of point $u^L$ is calculated by:

$$u^L = [p_x, \quad p_y, \quad p_z]^T = \left(\frac{u}{2^L}\right) \text{ were } p \text{ is the actual volume position}$$

b) at each level L of the pyramidal representation of the volumes gradients are calculated in each direction of the Cartesian coordinates x, y, z.

For the Cartesian coordinate x the volume gradient is calculated according to the following equation:

$$I_{\Delta x}(u_x, u_y, u_z) = \frac{I^L(u_x+1, u_y, u_z) - I^L(u_x-1, u_y, u_z)}{2}$$

This equation applies correspondingly also for the other two Cartesian coordinates y and z:

$$I_{\Delta y}(u_x, u_y, u_z) = \frac{I^L(u_x, u_y+1, u_z) - I^L(u_x, u_y-1, u_z)}{2}$$

$$I_{\Delta z}(u_x, u_y, u_z) = \frac{I^L(u_x, u_y, u_z+1) - I^L(u_x, u_y, u_z-1)}{2}$$

C) The volume gradients are then used for computing the gradient matrix according to the following equation:

$$G = \sum_{x=p_x-\omega}^{p_x+\omega} \sum_{y=p_y-\omega}^{p_y+\omega} \sum_{z=p_z-\omega}^{p_z+\omega} \begin{bmatrix} m_{200} & m_{110} & m_{010} \\ m_{110} & m_{020} & m_{011} \\ m_{101} & m_{011} & m_{002} \end{bmatrix}$$

Here the value ? defines the area size or the neighbourhood influencing the voxels.

The elements of the matrix are obtained in a similar way as the ones according to the above indicated definitions, namely:

$$m_{200} = I_{\Delta x}^2(u_x, u_y, u_z); \; m_{020} = I_{\Delta y}^2(u_x, u_y, u_z); \; m_{002} = I_{\Delta z}^2(u_x, u_y, u_z)$$

$$m_{110} = I_{\Delta x}(u_x, u_y, u_z) \cdot I_{\Delta y}(u_x, u_y, u_z)$$

$$m_{101} = I_{\Delta x}(u_x, u_y, u_z) \cdot I_{\Delta z}(u_x, u_y, u_z)$$

$$m_{001} = I_{\Delta y}(u_x, u_y, u_z) \cdot I_{\Delta y}(u_x, u_y, u_z)$$

d) For each level L an iterative vector ? is initialized: $\vec{v}^0 = [000]^T$ e) then for k=1 to a maximum count K or until a minimum displacement of $\vec{\eta}^k$ the following volume difference is calculated:

$$\delta I_k(u_x,u_y,u_z)=I^L(u_x,u_y,u_z)-J^L(u_x+g_x^L+v_x^{k-1},u_y+g_y^L+v_y^{k-1},u_z+g_z^L+v_z^{k-1})$$

a mismatch vector is calculated according to the following equation:

$$\vec{b}_k = \sum_{x=u_x-\omega}^{u_x+\omega} \sum_{y=u_y-\omega}^{u_y+\omega} \sum_{z=u_z-\omega}^{u_z+\omega} \delta I_k(u_x, u_y, u_z) \cdot \begin{pmatrix} I_x(u_x, u_y, u_z) \\ I_y(u_x, u_y, u_z) \\ I_z(u_x, u_y, u_z) \end{pmatrix}$$

the optical flow vector is then defined by $$\vec{\eta}^k = G^{-1}\vec{b}_k$$

an iterative movement vector can be computed using the above defined optical flow vector as:

$$\vec{v}^k = \vec{v}^{k-1} + \vec{\eta}_k$$

And this is set equal to the final optical flow for level L: $d^L = \vec{v}^k$

The above steps are repeated for each level until the last level L=0.

So the for the next level L−1 the global optical flow is calculated from the above computed values as:

$$g^{L-1}=[g_x^{L-1}g_y^{L-1}g_z^{L-1}]=2(g^L+d^L)$$

f) The final optical flow vector is then $$d=g^0+d^0$$

g) Now the coordinates of a point v in volume J corresponding to the point U in volume I can be computed as:

$$v=u+d$$

FIGS. 7 to 10 try to give a graphical and schematic idea of the effects of the above mentioned tracking method which is obviously a simplified representation of reality.

In FIG. 7 to 10 the two images I and J taken at different time T0 and T1 are represented as a 2-dimensional array of pixels as in the example of FIGS. 3 to 6.

A pixel 20 corresponding to a feature to be tracked and selected according to the above disclosed method is indicated in the 2-dimensional pixel array of image I. In Image J at the same position pixel 20" would correspond to the pixel 20 in absence of movements of the imaged object, in this case the breasts. A certain pixel neighbourhood of pixels of the pixel 20' is indicated by the grey shaded square corresponding to a 7×7 pixel array centred at the position of pixel 20" and which neighbourhood is indicated by number 10.

With 20' is indicated the new position of the feature 20 of image I. This means that breast tissue at position of pixel 20 has moved to position of pixel 20' over the time. Obviously the said pixel 20' is illustrated only for sake of explaining the way the tracking is carried out. In the real case this pixel is not known otherwise tracking would not be necessary.

The general method of tracking the pixels corresponding to selected features already described above by means of the mathematical formalism is described hereinafter by means of the practical example given in the drawings and limited to the two dimensional case for sake of simplicity. However a skilled person bearing in mind the general mathematical description of tracking can nevertheless understand and appreciate the way tracking occurs in a three dimensional case.

At the beginning of the tracking it is assumed that pixel 20 in image I has the same position namely the one of pixel 20" in image J. This pixel 20" is called hereinafter the tracked pixel, while the pixel 20 of image I selected as a feature will be called the feature pixel. Applying the algorithm first the inverse gradient matrix of a certain region, corresponding to a neighbourhood of the tracked pixel 20' and which in the case of the present example is the said 7×7 array of pixels (this value is adjustable) centred at pixel 20' in image J is calculated. This neighbourhood corresponds to the so called tracking region. By applying the pyramidal implementation of Lucas and Canade's feature tracking algorithm, that has been adapted to work on three dimensional image volumes and is explained in detail later the new position of a tracked feature on image J can be found.

The new position of the tracked feature at 20' in image J determines the optical flow vector. This is defined calculated in the first iterative step. As it appears form a comparison of FIGS. 7 and 8 the tracking region has shifted in such a way as to bring the centre of the tracking region closer to the new position of the same tissue area 20'.

The tracking is further iteratively applied by repeating the calculation of the mismatch vector between the pixel 20 representing the feature in image I and the new identified position of the centre of the tracking region in image J. This leads to the definition of a new optical flow vector and to a new shift of the pixel neighbourhood or tracking region as illustrated in FIG. 9.

The steps of determining the mismatch vector between the feature pixel 20 in image I and the centre of the tracking region is performed until the mismatch vector reached an adjustable minimum.

Figure 10:
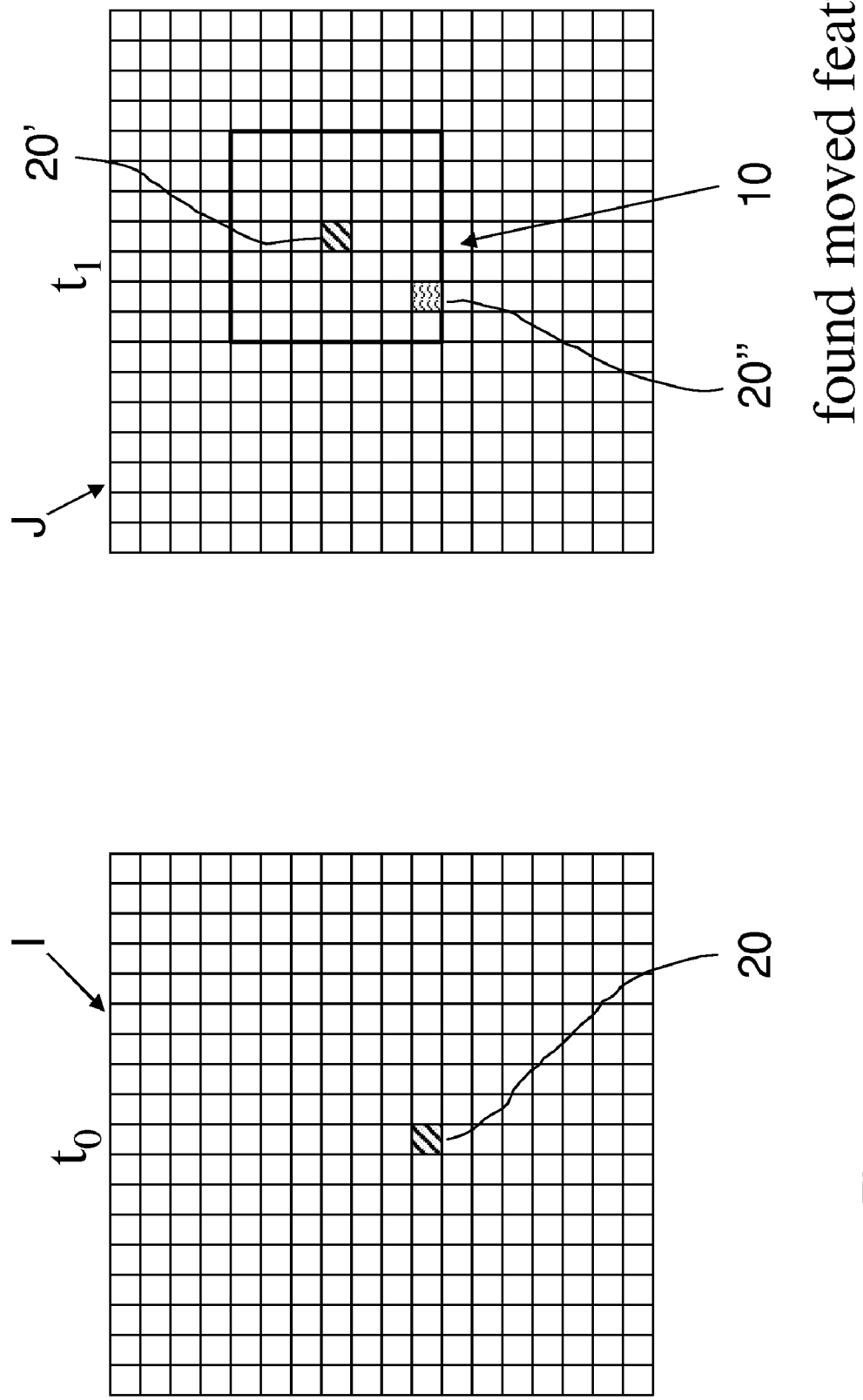

This situation is illustrated in FIG. 10. Relating to the graphic representation of FIG. 7 to 9 the pixel 20' is maintained at his position in order to highlight the fact that the tracking region is shifted so that it is finally centered around the correct new position 20' representing the same part of the breast as pixel 20 in image I.

The above example is carried out only with one feature represented by a pixel. The above steps have to be carried out for each feature selected in the image.

After all features have been tracked to it's new positions a certain amount of optical flow vectors at different positions all over the image/volume, but only within the regions representing breast tissue, exist. The greatest advance in comparison to other registration algorithms belongs to the fact, that said algorithm has spread out the optical flow vectors all over the image/volume.

Morphing is then carried out by applying the inverse optical flow vector to each feature and it's surrounding neighbourhood to image/volume J. This results in a new virtual image/volume of images J'.

FIG. 11 demonstrates the effect of the said method to real diagnostic images. The first set of images on the left shows a representative slice out of an breast exam at timecode t0 without contrast agent administered. The second image on the left was acquired at the same slice position at timecode t1 after contrast agent administration. The third image on the left visualizes the result of a pixel by pixel subtraction of each pixel's signal intensity at timecode t1 minus at timecode t0, the so called subtraction image. In absence of relative movements of the breasts during the time interval t1-t0, the resulting image would contain wide parts of pixels with signal intensity of zero appearing black where no contrast agent enhanced has occurred. Movement during the interval t1-t0 has the effect that artefacts are generated by pixels at the same position of image/volume I and J do not correspond to the same region of the tissue imaged. In this example the subtraction image shows one breast containing a contrast enhancing tumor, indicated with a small arrow. Most kinds of malignant and benign tumours of the breast show an additional contrast agent uptake caused by increased vascularisation. The additional white structures at the top of both breasts belong to movement artefacts. The remaining white structure in the centre of both breasts result of a weak contrast agent uptake of the normal breast parenchyma in combination with movement.

The right side of FIG. 11 shows the corresponding images with said registration algorithm applied:

The image at timecode t0 is not altered by the algorithm and therefore remains the same. But after three dimensional feature tracking a new virtual image volume was calculated. The second images on the right at timecode t1' shows the corresponding virtual image of the same slice position after registration was applied. The last image on the right side visualizes the result of a pixel by pixel subtraction of each pixel's signal intensity at timecode t1' minus at timecode t0, the new (virtual) subtraction image. One breast still shows the contrast enhancing tumor, indicated with a small arrow. Areas within the breast representing normal breast parenchyma still show some moderate contrast agent uptake appearing a bit less bright because of reduced motion artefacts. Wide parts of white structures at the top of both breasts have disappeared because of movement artefact compensation.

Example of FIG. 11 is a simplified since only a sequence of two images is considered one taken before and one after contrast agent is administered.

In reality a series of cross-sectional images (e.g. more than 50) can be acquired at regular time intervals before and after injection of the contrast media and subtraction images can be calculated between each couple of subsequent images.

In addition to acquiring more than one cross sectional image within a series also more than two series (e.g. 5 or even more) could be acquired one after another. This leads to several subtraction images/volumes. Of course the disclosed algorithm could be applied to all combination of series, equal whether they have been acquired before or after contrast agent movement, to reduce any movement that happened between.

In the following appendix the detailed theory of the pyramidal implementation of the Lucas Kanade tracking algorithm is given.

The above describe method according to the present invention can be carried out by means of an algorithm coded as a program which can be executed by a computer.

The program can be saved on a portable or on a static memory device such as a magnetic, optomagnetic or optical substrate as one or more floppy disks, one or more Magneto-potical disks, one or more CD-ROM or DVD-ROM or alternatively also on portable or stable hard disks. Alternatively the program can also be saved on solid state electronic devices such as pen drives or similar.

An example of the coded program in pseudocode is:

```
// build gradient volumes in X, Y and Z direction;
buildGradientVolumes( )
{
  for all positions in volume do
  {
    X-GradientVolume@position =
      GreyValue(originalVolume@position(x-1, y, z)) -
      GreyValue(originalVolume@position(x+1, y, z));
    Y-GradientVolume@position =
      GreyValue(originalVolume@position(x, y-1, z)) -
      GreyValue(originalVolume@position(x, y+1, z));
    Z-GradientVolume@position =
      GreyValue(originalVolume@position(x, y, z-1)) -
      GreyValue(originalVolume@position(x, y, z+1));
  }
}
/////////////////////////////////////////////////////////////
// selection of features
/////////////////////////////////////////////////////////////
for all Voxel in FirstVolume do
{
  // build matrix with X-, Y- and Z-gradients;
  gradientMatrix = buildGradientMatrix(position(x, y, z), i_SearchRegionSize);
  calcMnimumEigenvalue of gradientMatrix;
  if ( MnimumEigenvalue > i_GlobalMnimumQuality )
  {
    addToFeatureList(x,y,z,MnEigenValue);
  }
}
for all Features in FeatureList fromhighest to lowest eigenvalue do
{
  if ( Feature->MnEigenValue < i_percentvalue of OverallMaximumEigenvalue ) {
    deleteFeatureFromList( );
  }
  if ( distance to another Feature < i_MnDistance ) {
    deleteFeatureFromList( );
  }
}
if ( Number of Features > i_MaximumNumberOfFeatures )
{
  deleteFromList(FeaturesWithSmallerMnEigenValue);
}
/////////////////////////////////////////////////////////////
// tracking of selected features
/////////////////////////////////////////////////////////////
for each Feature in FeatureList do
```

```
{
  // build matrix from X-, Y- and Z-gradients of the original Volume at feature position
  GradientMatrix = buildGradientMatrix(featurePosition, i_TrackingRegionSize);
  invertedGradientMatrix = invert(GradientMatrix);
  do
  {
    if ( FeatureMovement Vector > i_MaximumAllowedDisplacement) {
       featureTracked = false;
       break;
    }
    for all Offsets in i_TrackingRegionSize do
    {
       diff =
          GreyValue(OriginalVolume@OriginalFeaturePosition + Offset) −
          GreyValue(MovedVolume@TrackedFeaturePosition + Offset);
       vectorX = vectorX + diff * GreyValue(X-GradientVolume@actualFeaturePosition);
       vectorY = vectorY + diff * GreyValue(Y-GradientVolume@actualFeaturePosition);
       vectorZ = vectorZ + diff * GreyValue(Z-GradientVolume@actualFeaturePosition);
    }
    mismatchVector = mathVector(vectorX, vectorY, vectorZ);
    currentMovementVector = invertedGradienMatrix * mismatchVector;
    FeatureMovementVector = FeatureMovementVector + currentMovementVector;
    if (currentMovementVector < i_MnimumDisplacement) {
       featureTracked = true;
       break;
    }
    if ( NumberOfIterations > i_MaximumAllowedIterations ) {
       featureTracked = false;
       break;
    }
    NumberOfIterations = NumberOfIterations + 1;
  }
  while (true)
}
/////////////////////////////////////////////////////////////
// calculation of gradient matrix
function buildGradientMatrix(position, regionSize)
{
  for all Offsets in regionSize do
  {
    Ix = GreyValue(X-GradientVolume@position + Offset);
    Iy = GreyValue(Y-GradientVolume@position + Offset);
    Iz = GreyValue(Z-GradientVolume@position + Offset);
    Ixx = Ixx + Ix * Ix;
    Iyy = Iyy + Iy * Iy;
    Izz = Izz + Iz * Iz;
    Ixy = Ixy + Ix * Iy;
    Ixz = Ixz + Ix * Iz;
    Iyz = Iyz + Iy * Iz;
  }
  return gradientMatrix( Ixx Ixy Ixz
                         Ixy Iyy Iyz
                         Ixz Iyz Izz );
}
```

What is claimed is:

1. A method of registering biomedical images to reduce imaging artifacts caused by object movement, the method comprising:
   a) providing at least a first and a second digital or digitalized images or set of cross-sectional images of the same object, each image being formed by a two or three dimensional array of pixels or voxels;
   b) defining within the first image or set of images a number of landmarks or features by selecting a number of pixels or voxels which are set as landmarks or features, and generating a list of said features to be tracked;
   c) tracking the position of each pixel or voxel selected as a feature from the first to the second image or set of images by determining an optical flow vector from the first to the second image or set of images for each pixel or voxel of the list;
   d) registering the first and the second image or set of images by applying an inverse optical flow vector to the pixels or voxels of the second image or set of images, wherein an automatic feature selection step is carried out comprising:
   B1) defining a pixel or voxel neighborhood around each pixel or voxel of the first image or first set of cross-sectional images, the pixel or voxel neighborhood comprising a limited number of pixels or voxels, wherein a two dimensional neighborhood is chosen for a single image, and wherein a three dimensional neighborhood is chosen for the set of cross-sectional images; and
   B2) for each pixel or voxel of the first image or first set of cross-sectional images, determining a mean signal intensity value of all pixels or voxels within the neighborhood;
   B3) defining a mean signal intensity value threshold;
   B4) comparing the mean signal intensity value determined for each pixel or voxel neighborhood at step B2 and comparing the said mean signal intensity value with the mean signal intensity value threshold; and
   B5) if the mean signal intensity value of one neighborhood is higher than the threshold at step B4, the pixels or voxels of the one neighborhood are defined as a feature to be tracked, which is added to the list of features to be tracked.

2. The method according to claim 1, wherein the mean signal intensity threshold value is determined by one more experiments, the one or more experiments comprising,
   carrying out the method on a set of test or sample images, and
   comparing the results obtained for different threshold values.

3. The method according to claim 1, wherein the pixels or voxels selected to be features or landmarks to be tracked within the second image are automatically tracked through a Lucas & Kanade automatic feature tracking algorithm.

4. The method according to claim 3, wherein the Lucas & Kanade automatic feature tracking algorithm has been expanded to function on three dimensional image volumes instead of two dimensional images, thereby becoming usable with cross sectional image volumes, the method further comprising:
   C1) providing a first 3-dimensional image volume I formed by a 3-dimensional array of voxels;
   C2) defining a voxel neighborhood for each target voxel, the voxel neighborhood surrounding the target voxel and having an adjustable size centered at the target voxel;
   C3) defining a Cartesian coordinate system, and calculating relatively to each axis of the Cartesian coordinate system a gradient volume formed by intensity gradients of each voxel of the first 3-dimensional image volume relatively to its neighborhood voxels, the gradient volume of each axis of the Cartesian coordinate system being defined by:

a) gradient volume in X-direction: $I_{\Delta x}(x, y, z) = \frac{I(x+1, y, z) - I(x-1, y, z)}{2}$ b) gradient volume in Y-direction: $I_{\Delta y}(x, y, z) = \frac{I(x, y+1, z) - I(x, y-1, z)}{2}$ c) gradient volume in Z-direction: $I_{\Delta z}(x, y, z) = \frac{I(x, y, z+1) - I(x, y, z-1)}{2}$ C4) calculating a gradient matrix for each target voxel, the gradient matrix being defined by:

$$G = \begin{bmatrix} m_{200} & m_{110} & m_{101} \\ m_{110} & m_{020} & m_{011} \\ m_{101} & m_{011} & m_{002} \end{bmatrix}$$

with
$m_{200} = I^2_{\Delta x}(x,y,z)$,
$m_{020} = I^2_{\Delta y}(x,y,z)$,
$m_{002} = I^2_{\Delta z}(x,y,z)$,
$m_{110} = I_{\Delta x}(x,y,z) \cdot I_{\Delta y}(x,y,z)$, $m_{101} = I_{\Delta x}(x,y,z) \cdot I_{\Delta z}(x,y,z)$,
$m_{011} = I_{\Delta y}(x,y,z) \cdot I_{\Delta z}(x,y,z)$;

C5) calculating, for each gradient matrix of each target voxel of the 3-dimensional image volume, a minimum eigenvalue ?m by:
   C51) defining:

$$c = m_{200} \cdot m_{020}$$
$$d = m^2_{011}$$
$$e = m_{110} \cdot m_{101}$$
$$f = m_{101} \cdot m_{101}$$
$$- m_{200} - m_{020} - m_{002}$$
$$q = c + (m_{200} + m_{020})m_{002} - d - e - f$$
$$r = (e - c)m_{002} + dm_{200} - 2(m_{110} \cdot m_{011} \cdot m_{101}) + f \cdot m_{020}$$
$$a = q - \frac{p^2}{3} \quad b = \frac{2p^3}{27} - \frac{pq}{3} + r$$
$$\theta = \frac{1}{3}\cos^{-1}\left(\frac{3b}{an}\right) \text{ with } n = 2\sqrt{\frac{-a}{3}}$$

wherein:

$$\left|3\frac{b}{an}\right| \leq 1 \wedge a \leq 0,$$

because G is a matrix of central moments, and
   C52) calculating the minimum eigenvalue of the gradient matrix as:

$$\lambda_1 = n \cdot \cos\theta - \frac{p}{3}$$
$$\lambda_2 = n\left[\frac{\cos\theta + \sqrt{3}\sin\theta}{2}\right] - \frac{p}{3} \Rightarrow \lambda_m = \text{minimum}(\lambda_1, \lambda_2, \lambda_3)$$
$$\lambda_3 = n\left[\frac{\cos\theta - \sqrt{3}\sin\theta}{2}\right] - \frac{p}{3}$$

C6) defining a threshold for the minimum eigenvalue ?m; and
   C7 selecting each voxel as one feature to be tracked in the image I for which a corresponding gradient matrix has a minimum eigenvalue ?m satisfying the following criteria:
   i) ?m is bigger than the threshold;
   ii) ?m is not smaller than a predetermined percentage of a maximum of all minimum values ?m of the eigenvalues;
   iii) if another voxel selected as a feature exists in a defined voxel neighborhood around the target voxel also maintained as a selected feature, only the voxels whose gradient matrix has the bigger minimum value ?m of the eigenvalue is selected as the feature, the other voxel being is discarded from the list of the features that may be tracked; and
   iv) the mean signal intensity value of a 3d-neighborhood around the voxel selected as one feature is bigger than an adjustable mean signal intensity value threshold.

5. The method according to claim 4, wherein the threshold for the mean signal intensity value is about 10.

6. The method according to claim 4, wherein for each voxel selected as one feature in the first image volume I, said feature in the first image volume I is tracked relatively to its position in a voxel array of a second image J of the same object taken at a second later time through a pyramidal implementation of the Lucas & Kanade feature tracker.

7. The method according to claim 6, wherein the pyramidal implementation of the Lucas & Kanade feature tracker comprises the following steps:

defining as u a point in the image volume I corresponding to the 3-dimensional array of voxels of the image volume I and as v the corresponding point in the image volume J corresponding to the 3-dimensional array of voxels in image J, the point v having the coordinates of a voxel selected as a feature in image I;

building two ideal pyramids of the image volumes I and J with $I^L$ and $J^L$ representing the volume at level L=0, . . . , m with the basement (L=0) representing the original volume;

reducing in size the volume of each following floor by combining an amount of pixels in one neighborhood to one mean value;

defining a global pyramidal movement vector g, which is initialized on the highest floor $L_m$, as:

$$g^{L_m} = [\, g_x^{L_m} \ \ g_y^{L_m} \ \ g_z^{L_m} \,]^T = [\,0 \ \ 0 \ \ 0\,]^T;$$

and further:

i) defining the position of the point u as $u^L$ and calculating said position by the following equation, where L has the value of the actual floor or level of the pyramid:

$$u^L = [p_x, p_y, p_z]^T = \left\{ \frac{u}{2^L} \right\}$$

where p is the actual volume position;

ii) calculating the gradient volumes in each direction of the Cartesian coordinates x, y, z according to the following equations for the gradient volumes:

$$I_{\Delta x}(u_x, u_y, u_z) = \frac{I^L(u_x + 1, u_y, u_z) - I^L(u_x - 1, u_y, u_z)}{2}$$

$$I_{\Delta y}(u_x, u_y, u_z) = \frac{I^L(u_x, u_y + 1, u_z) - I^L(u_x, u_y - 1, u_z)}{2}$$

$$I_{\Delta z}(u_x, u_y, u_z) = \frac{I^L(u_x, u_y, u_z + 1) - I^L(u_x, u_y, u_z - 1)}{2}$$

iii) using the gradient volumes of the preceding step for computing the gradient matrix according to the following equation:

$$G = \sum_{x=p_x-\omega}^{p_x+\omega} \sum_{y=p_y-\omega}^{p_y+\omega} \sum_{z=p_z-\omega}^{p_z+\omega} \begin{bmatrix} m_{200} & m_{110} & m_{010} \\ m_{110} & m_{020} & m_{011} \\ m_{101} & m_{011} & m_{002} \end{bmatrix}$$

with
$m_{200} = I^2{}_{\Delta x}(u_x, u_y, u_z)$;
$m_{020} = I^2{}_{\Delta y}(u_x, u_y, u_z)$;
$m_{002} = I^2{}_{\Delta z}(u_x, u_y, u_z)$;
$m_{110} = I_{\Delta x}(u_x, u_y, u_z) \cdot I_{\Delta y}(u_x, u_y, u_z)$;
$m_{101} = I_{\Delta x}(u_x, u_y, u_z) \cdot I_{\Delta z}(u_x, u_y, u_z)$;
$m_{001} = I_{\Delta y}(u_x, u_y, u_z) \cdot I_{\Delta z}(u_x, u_y, u_z)$;

and where the value ? defines an area size or a neighborhood of voxels influencing the target voxels representing the tracked feature;

iv) initializing for each level L an iterative vector defined by:

$\vec{v}^0 = [0\ 0\ 0]^T$;

v) for k=1 to a maximum count K, or until a minimum displacement of an optical flow vector $\vec{\eta}^k$, calculating the following volume difference:

$$\delta I_k(u_x, u_y, u_z) = I_L(u_x, u_y, u_z) - J^L(u_x + g_x^L + v_x^{k-1}, u_y + g_y^L + v_y^{k-1}, u_z + g_z^L + v_z^{k-1})$$

vi) calculating a mismatch vector according to the following equation:

$$\vec{b}_k = \sum_{x=u_x-\omega}^{u_x+\omega} \sum_{y=u_y-\omega}^{u_y+\omega} \sum_{z=u_z-\omega}^{u_z+\omega} \delta I_k(u_x, u_y, u_z) \cdot \begin{pmatrix} I_x(u_x, u_y, u_z) \\ I_y(u_x, u_y, u_z) \\ I_z(u_x, u_y, u_z) \end{pmatrix}$$

vii) determining the optical flow vector according to the following equation $\vec{\eta}^k = G^{-1} \vec{b}_k$ where $G^{-1}$ is the inverse gradient matrix of G determined at step iii);

viii) computing an iterative movement vector using the above defined optical flow vector as:

$\vec{v}^k = \vec{v}^{k-1} + \vec{\eta}^k$ and setting this to equal the final optical flow for level L: $d^L = \vec{v}^k$;

ix) repeating steps i) to viii) for each level until the last level L=0 reaches the final optical flow vector defined by equation:

$d = g^0 + d^0$ x) determining the coordinates of the point v in the volume J which corresponds to the point u representing the feature to be tracked in the volume I by the following equation:

$v = u + d$ and xi) repeating the above method for each voxel corresponding to each feature selected in image I.

8. The method according to claim 7, wherein the two images I and J are registered by applying the inverse optical flow vector to each point v in the image J identified as corresponding to a voxel representing a feature corresponding to the point u of a voxel corresponding to a selected feature in the image I, or by applying the optical flow vector to the points u corresponding each to a voxel identified as one selected feature in the image I.

9. The method according to claim 1, further comprising a method for contrast media enhanced diagnostic imaging comprising:

a) providing at least a first and a second digital or digitalized image or set of cross-sectional images of the same object acquired by the contrast media enhanced diagnostic imaging, said images being formed by a two or three dimensional array of pixels or voxels, wherein scanning of a same tissue or tissue zone or of a same anatomical district is performed in presence of a contrast media in said tissue or tissue zone or in said anatomical district at a second time or at any following time;

b) defining within the first image or set of images a number of landmarks or features by selecting a number of pixels or voxels, which are set as the landmarks or features, and generating a list of said features to be tracked;

c) tracking the position of each pixel or voxel selected as one feature from the first to the second image or set of images by determining an optical flow vector from the first to the second image or set of images for each pixel or voxel selected as the feature; and d) registering the first and the second image or set of images by applying an inverse optical flow vector to the pixels or voxels of the second image or set of images.

10. The method according to claim 9, wherein the contrast media enhanced diagnostic imaging is magnetic resonance imaging (MRI) or ultrasound imaging.

11. The method according to claim 1, wherein the automatic feature selection step is performed after generating the list of features ti be tracked and prior to tracking the position of each pixel or voxel selected as a feature fro the first to the second image or set of images.

12. The method according to claim 1, wherein the method is application-independent.

13. A computer readable medium carrying on for more sequences of instructions for registering biomedical images to reduce imaging artifacts caused by object movement, wherein execution of the one or more sequences of instructions by one or more processors causes the one or more processors to perform the steps of:

a) providing at least a first and a second digital or digitalized images or set of cross-sectional images of the same object, each image being formed by a two or three dimensional array of pixels or voxels;

b) defining within the first image or set of images a number of landmarks or features by selecting a number of pixels or voxels which are set as landmarks or features, and generating a list of said features to be tracked;

c) tracking the position of each pixel or voxel selected as a feature from the first to the second image or set of images by determining an optical flow vector from the first to the second image or set of images for each pixel or voxel of the list;

d) registering the first and the second image or set of images by applying an inverse optical flow vector to the pixels or voxels of the second image or set of images, wherein an automatic feature selection step is carried out comprising:

B1) defining a pixel or voxel neighborhood around each pixel or voxel of the first image or first set of cross-sectional images, the pixel or voxel neighborhood comprising a limited number of pixels or voxels, wherein a two dimensional neighborhood is chosen for a single image, and wherein a three dimensional neighborhood is chosen for the set of cross-sectional images; and B2) for each pixel or voxel of the first image or first set of cross-sectional images determining a mean signal intensity value of all pixels or voxels within the neighborhood;

B3) defining a mean signal intensity value threshold;

B4) comparing the mean signal intensity value determined for each pixel or voxel neighborhood at step B2 and comparing the said mean signal intensity value with the mean signal intensity value threshold; and B5) if the mean signal intensity value of one neighborhood is higher than the threshold at step B4, the pixels or voxels of the one neighborhood are defined as a feature to be tracked, which is added to the list of features to be tracked.

* * * * *